(12) United States Patent
Leichter (10) Patent No.: US 8,042,699 B2
(45) Date of Patent: Oct. 25, 2011

(54) ADJUSTABLE CABLE ROUTING SPOOL

(75) Inventor: Eric Leichter, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 654 days.

(21) Appl. No.: 12/128,911

(22) Filed: May 29, 2008

(65) Prior Publication Data
US 2009/0294388 A1  Dec. 3, 2009

(51) Int. Cl.
*A47F 7/00* (2006.01)
(52) U.S. Cl. ...................... 211/85.5; 211/26.2
(58) Field of Classification Search .............. 211/26.2, 211/26, 192, 191, 59.1, 85.5, 103, 187, 207, 211/190; 248/220.31, 220.41, 220.42, 220.43, 248/221.11, 221.12, 222.14, 222.51, 222.52, 248/222.41; 361/826
See application file for complete search history.

(56) References Cited

U.S. PATENT DOCUMENTS

| | | | | |
|---|---|---|---|---|
| 4,303,217 A | * | 12/1981 | Garfinkle | 248/220.42 |
| 4,619,428 A | * | 10/1986 | Bailey | 248/220.43 |
| 4,681,233 A | * | 7/1987 | Roth | 211/70.6 |
| 5,640,482 A | * | 6/1997 | Barry et al. | 385/135 |
| 6,003,685 A | * | 12/1999 | Malin | 211/7 |
| 6,266,250 B1 | * | 7/2001 | Foye | 361/760 |
| 6,398,149 B1 | | 6/2002 | Hines et al. | |
| 6,405,984 B1 | * | 6/2002 | Simons et al. | 248/220.41 |
| 6,481,583 B1 | * | 11/2002 | Black et al. | 211/70.6 |
| 6,581,788 B1 | * | 6/2003 | Winig et al. | 211/90.01 |
| 6,595,379 B1 | * | 7/2003 | Powell | 211/192 |
| 6,614,978 B1 | | 9/2003 | Caveney | |
| 7,070,021 B1 | * | 7/2006 | McKinney | 182/92 |
| 7,083,051 B2 | * | 8/2006 | Smith et al. | 211/26 |
| 7,298,952 B2 | | 11/2007 | Allen et al. | |
| 7,302,155 B2 | | 11/2007 | Weinert et al. | |
| 7,513,374 B2 | * | 4/2009 | Smith et al. | 211/26.2 |

* cited by examiner

*Primary Examiner* — Jennifer E. Novosad
(74) *Attorney, Agent, or Firm* — Muncy, Geissler, Olds & Lowe, PLLC (57) ABSTRACT

A cabling spool for guiding or storing cable, such as is often employed in network racks or other cabling cabinets or enclosures to organize cable layouts and store excess cable, includes a spool body and an end flange. The spool body has a surface with a radius, sized to prevent a minimum bend radius of a cable from being exceeded. The end flange of the spool keeps cables passing about the spool body from leaving the spool. The end flange may be attached to the spool body in a number of positions, e.g., in an upward position, when a majority of cables pass over a top of the spool body; in a downward position, when a majority of cables pass over a bottom of the spool body. The end flange may optionally be rotated relative to the spool body.

18 Claims, 9 Drawing Sheets

ADJUSTABLE CABLE ROUTING SPOOL

BACKGROUND OF THE INVENTION

1. Field of the Invention

The present invention relates to a management apparatus for cables. More particularly, the present invention relates to a device, such as a spool, for guiding one or more cables in a different direction and/or for storing cable slack. A spool is often used in combination with a network/equipment rack for managing fiber optic or other communication cables.

2. Description of the Related Art

There are many types of spools, which are known in the art of cable guidance, organization and storage.

Figure 1:
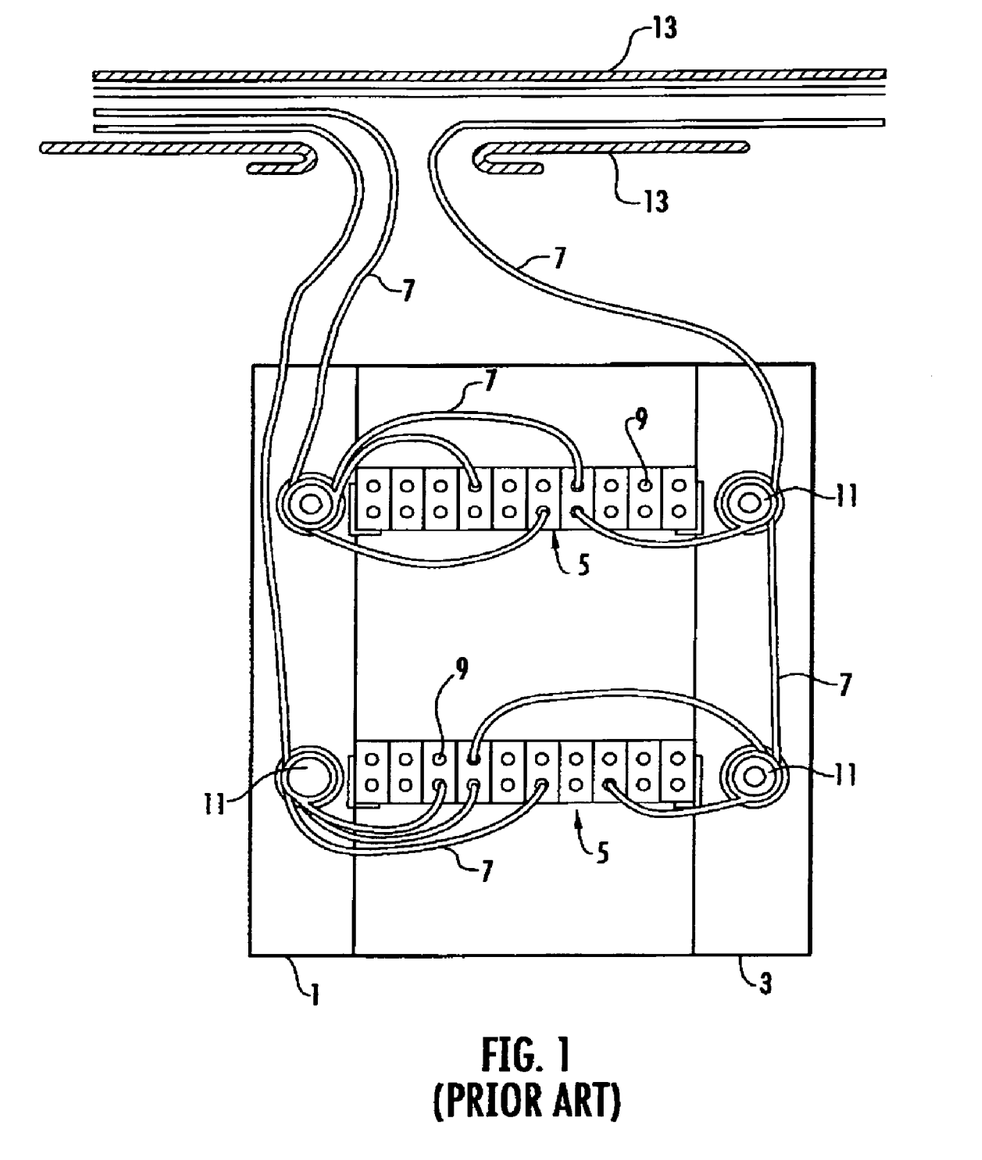
FIG. 1 is a front view of a first network rack with spools, in accordance with the prior art.

For example, FIG. 1 illustrates a spool in accordance with the prior art of U.S. Pat. No. 7,302,155, which is incorporated herein by reference. In FIG. 1, a first rack 1 and a second rack 3 support a plurality of brackets 5 holding ports 9, i.e., patch panels. Connectors on the ends of cables 7 are connected to the ports 9. The cables 7 extend from the ports 9 to spools 11. At the spools 11, the cables 7 are guided around the spool 11 and redirected to another port 9 or into an overhead conduit 13. Excess cable 7 may be wrapped multiple times about one or more spools 11.

Figure 2:
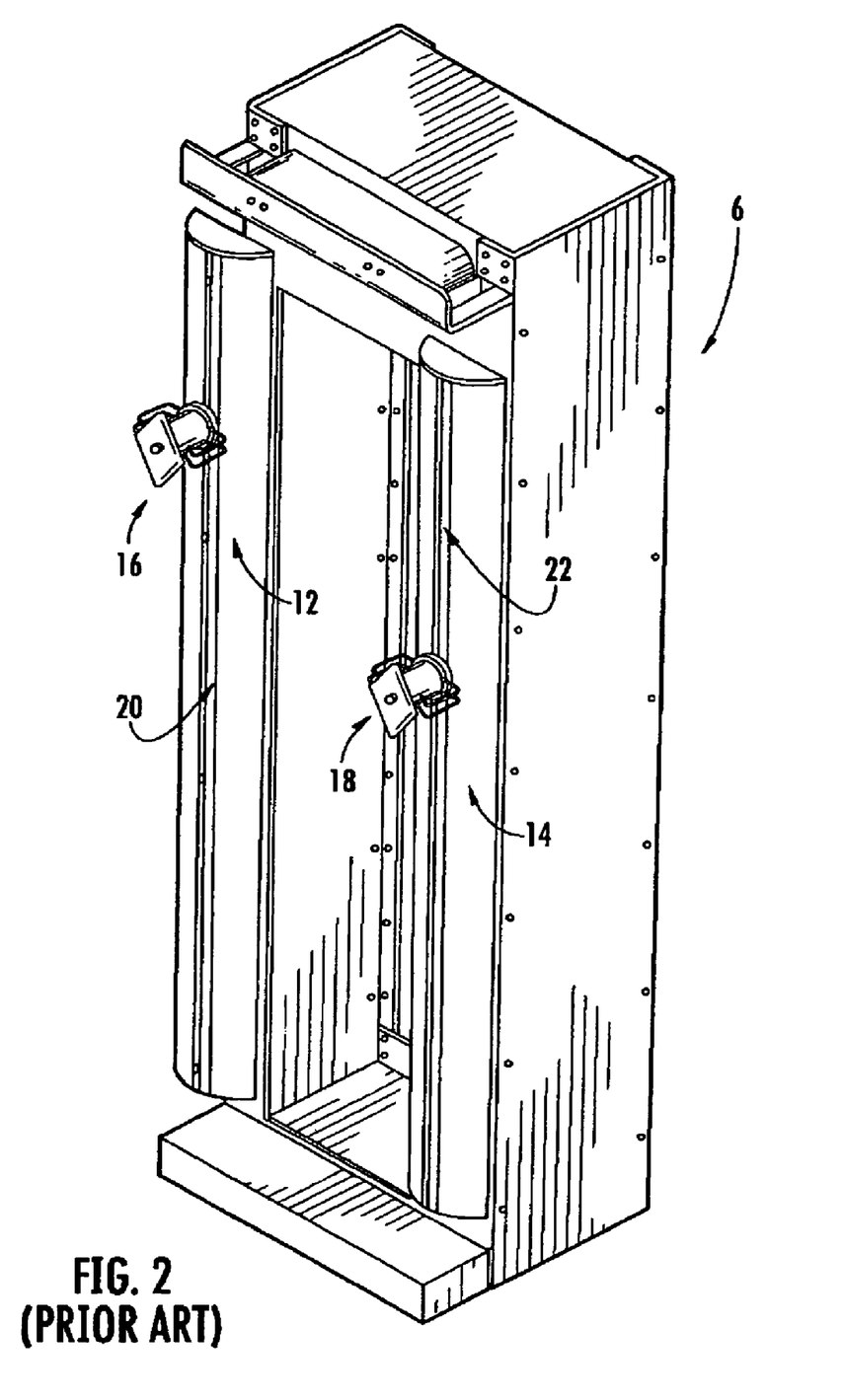
FIG. 2 is a front perspective view of a second network rack with spools, in accordance with the prior art.

FIG. 2 illustrates a spool in accordance with the prior art of U.S. Pat. No. 6,398,149, which is incorporated herein by reference. In FIG. 2, a network rack 6 (illustrated without ports, connectors or cabling to simplify the drawing) has a first track assembly 12 and a second track assembly 14 supported on opposing sides of the network rack 6. A first spool 16 is engaged within a first track 20 of the first track assembly 12. A second spool 18 is engaged within a second track 22 of the second track assembly 14.

The first spool 16 may be selectively slid up and down within the first track 20 and locked into a desired position by a user, such that the first spool 16 may be positioned at a most desirable position relative to the cables to be accommodated by the first spool 16. Of course, additional spools could be added to the first track assembly 12. Also, the operation of the second spool 18 in the second track assembly 14 would be identical.

Figure 3:
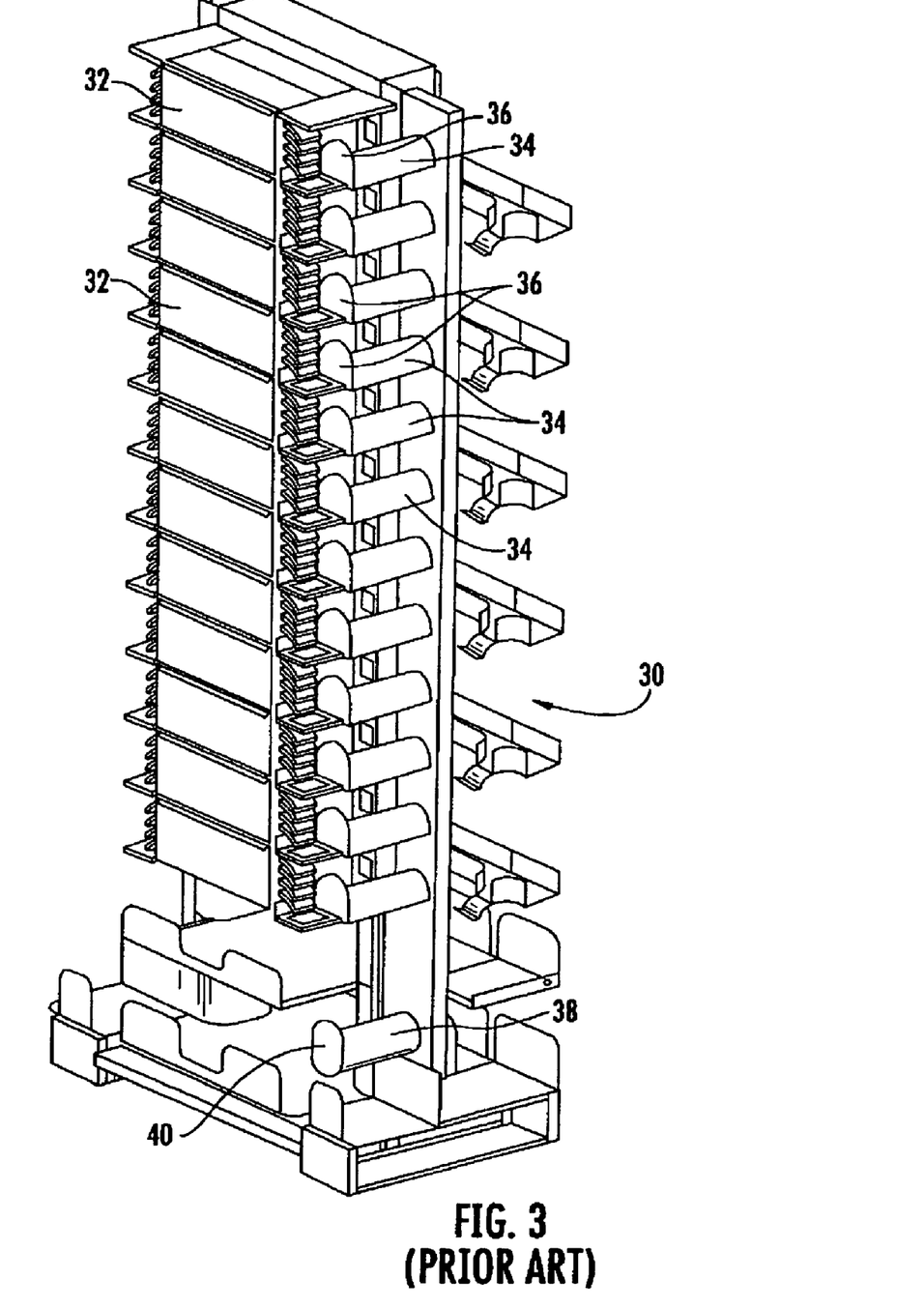
FIG. 3 is a front perspective view of a third network rack with spools, in accordance with the prior art.

FIG. 3 illustrates a spool in accordance with the prior art of U.S. Pat. No. 6,614,978, which is incorporated herein by reference. In FIG. 3, a network rack 30 supports a plurality of optical or electrical devices 32 with numerous ports to which plural cables would be connected. A plurality of first spools 34 are mounted adjacent to the devices 32. The first spools 34 have an upwardly directed end flange 36. The first spools 34 do not have any downwardly directed end flange. No downwardly directed end flange is present on the first spools 34 because, in use, cables only pass along the top of a spool body of the first spools 34 and there is no need to provide a downwardly directed end flange, which would add cost and occupy additional space in the network rack 30.

At the bottom of the network rack 30, a second spool 38 of a different design is provided. The second spool 38 includes an end flange 40 which extends both upwardly and downwardly from the spool body of the second spool 38. The end flange 40 extends in both directions because cables are intended to be directed across the top and bottom of the second spool 38, such that the extended flange 40 is needed in order to keep the cables on the second spool 38.

Figure 4:
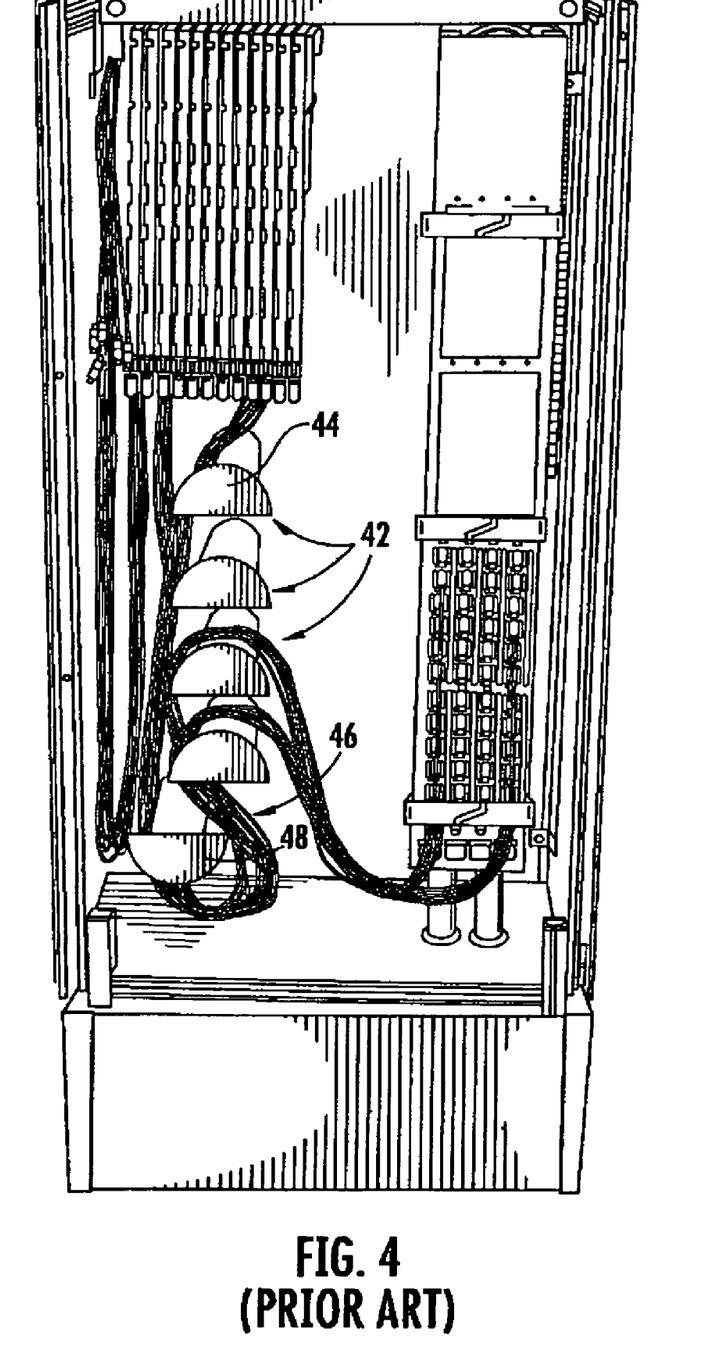
FIG. 4 is a front view of a fourth network rack with spools, in accordance with the prior art.

FIG. 4 illustrates a spool in accordance with the prior art of U.S. Pat. No. 7,298,952, which is incorporated herein by reference. In FIG. 4, third spools 42 of a design similar to the first spools 34 of FIG. 3 are employed. The third spools 42 have an upwardly extending end flange 44 to retain cables passing along a top surface of the third spools 42. FIG. 4 also illustrates a fourth spool 46. The fourth spool 46 has a downwardly extending end flange 48 to retain cables passing along a lower surface of the fourth spool 46. In practice, the fourth spool 48 is simply a third spool 42 mounted in an upside down fashion, such that the curved portion of the spool body and the end flange 48 face downwardly.

SUMMARY OF THE INVENTION

The Applicant has appreciated one or more drawbacks associated with the spools of the prior art.

As spools with different types of end flanges may be required in different circumstances, e.g., spools 34 and 38 in FIG. 3, it is incumbent upon a technician to purchase, inventory and carry several different types of spools when working on network racks or similar types of equipment.

Often times, it is desirable to display logos, trademarks, service contact information, warnings, notes or similar text on the flat surface of the end flange of a spool. If the service technician simply mounts one of the spools upside down, e.g., spool 46 versus spool 42 in FIG. 4, so as to reduce the number of spools to be inventoried and carried, the text will be upside down.

In some situations, a "best fit" spool must be selected by a service technician to accommodate the specific cabling requirements. In other words, in a situation where twenty runs of cable will be passed along a top surface of a spool and ten runs of cable will be passed along a bottom surface of a spool, the technician may only be able to select a spool having an end flange with 90% of the end flange at the top and 10% of the end flange at the bottom, e.g., spool 38 in FIG. 3, or select a spool with 50% of the end flange at the top and 50% of the end flange at the bottom, e.g. spool 11 in FIG. 1. The optimum spool for the circumstance might be a spool having 67% of the end flange at the top and 33% of the end flange at the bottom. Also, differently sized end flanges would be beneficial so as not to take up excess space on the network rack. However, purchasing, inventorying and carrying such a multitude of spools to the work site would be overly burdensome.

The Applicant has also appreciated a need for a spool, which is simple in design, rugged, more flexible as to end uses, easy to manufacture and/or less expensive to manufacture.

It is an object of the present invention to address one or more of the drawbacks of the prior art spools and/or Applicant's appreciated needs in the art.

These and other objects are accomplished by a cabling spool for guiding or storing cable, such as is often employed in network racks or other cabling cabinets or enclosures to organize cable layouts and store excess cable. The spool includes a spool body having a surface with a radius, sized to prevent a minimum bend radius of a cable from being exceeded. An end flange of the spool keeps cables passing about the spool body from leaving the spool. The end flange may be attached to the spool body in a number of positions, e.g., in an upward position, when a majority of cables pass over a top of the spool body; in a downward position, when a majority of cables pass over a bottom of the spool body. The end flange may optionally be rotated relative to the spool body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "cover", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 5:
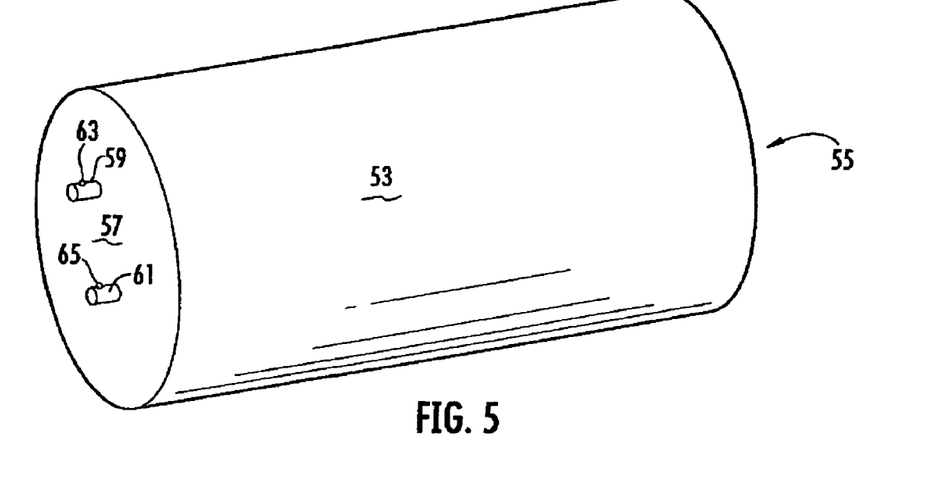
FIG. 5 is a front and side perspective view of a spool body, in accordance with the present invention.
Figure 10:
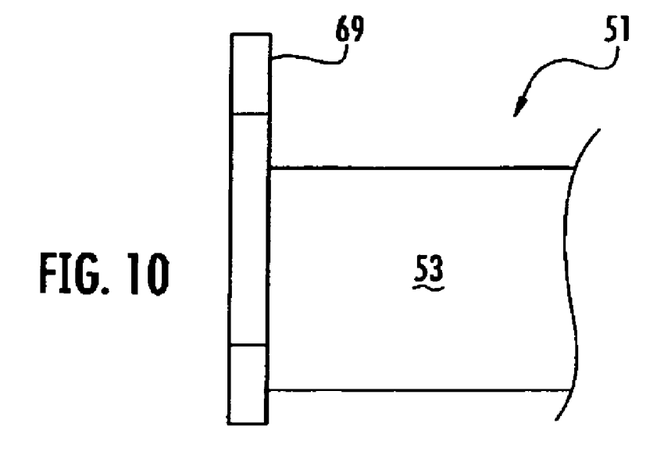
FIG. 10 is a side view of the end flange of FIG. 7 attached to the spool body of FIG. 5 in a first position.
Figure 11:
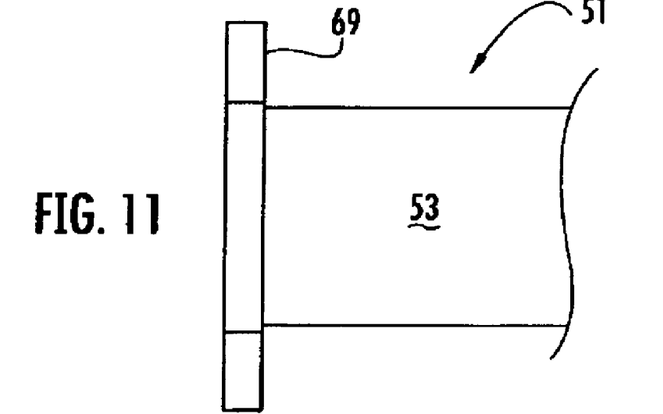
FIG. 11 is a side view of the end flange of FIG. 7 attached to the spool body of FIG. 5 in a second position.
Figure 12:
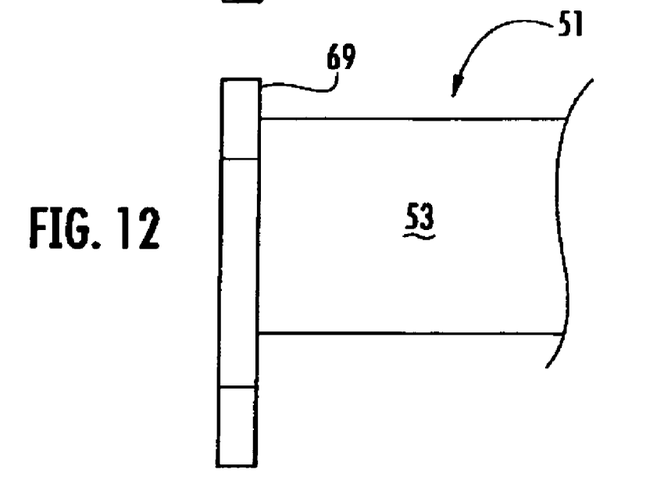
FIG. 12 is a side view of the end flange of FIG. 7 attached to the spool body of FIG. 5 in a third position.

FIG. 5 is a front and side perspective view of a spool body 53 of a spool apparatus or spool 51 in accordance with the present invention (See FIGS. 10-12). The spool body 53 is generally cylindrical, with a round cross sectional shape, and has a first end 55 and a second end 57. The second end 57 is remote, and preferably opposite to, the first end 55.

The second end 57 of the spool body 53 includes a first connector structure. In one embodiment, the first connector structure includes first and second projecting portions 59 and 61, such as cylinder-shaped members. The first and second projecting portions 59 and 61 may optionally include spring-loaded pins 63 and 65. The spring-loaded pins 63 and 65 are biased so as to protrude from the side of the first and second projecting portions 59 and 61, as illustrated. However, under an applied force, the spring-loaded pins 63 and 65 may be pressed into the first and second projecting portions 59 and 61, respectively.

Figure 6:
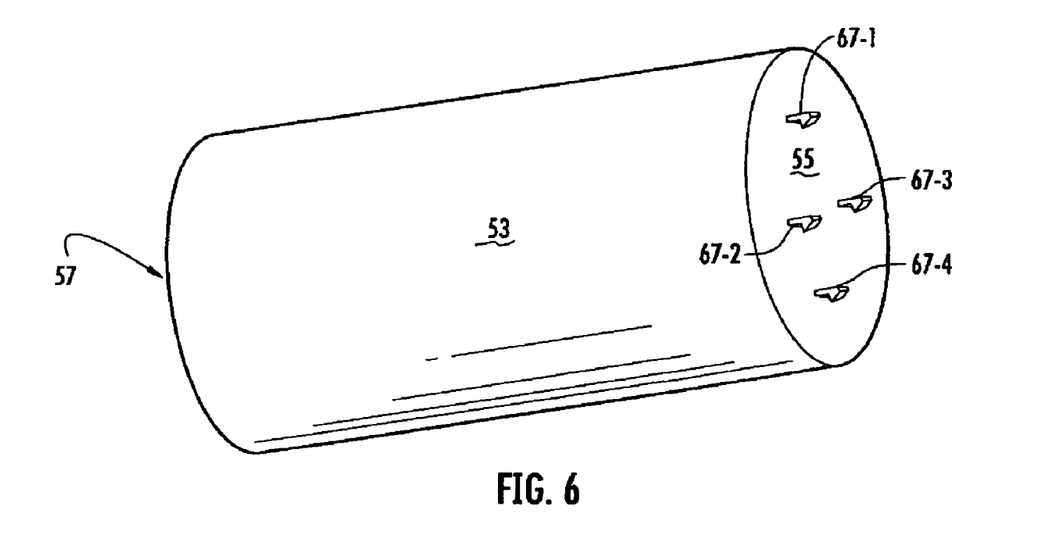
FIG. 6 is a rear and side perspective view of the spool body of FIG. 5.

FIG. 6 is a rear and side perspective view of the spool body 53 of FIG. 5. The first end 55 of the spool body 53 includes locking features. In one embodiment, the locking features include resilient snap-locking tabs 67-1, 67-2, 67-3, 67-4. The resilient locking tabs 67-1, 67-2, 67-3, 67-4 are designed to snap past retaining features on another structure (such as mounting holes on a network rack), so as to attach the spool body 53 to another structure, as will be further explained in connection with FIG. 14. Of course, other locking features may be employed to attach the spool body 53 to another structure, such as the adjustable slide locking features of the spool 14 in FIG. 2.

Figure 7:
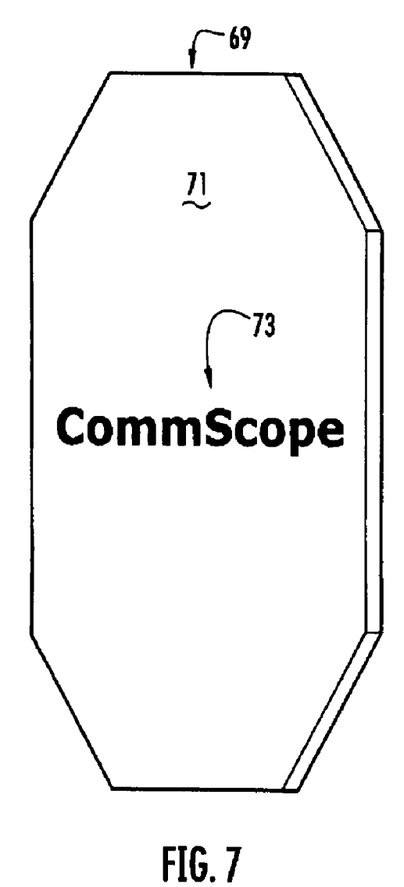
FIG. 7 is a front perspective view of an end flange for attachment to the spool body of FIG. 5.

FIG. 7 is a front perspective view of an end flange 69, in accordance with the present invention. A front surface 71 of the end flange 69 is generally flat and planar surface. The front surface 71 may include indicia 73, such as logos, trademarks, service contact information, warnings, notes or similar text.

Figure 8:
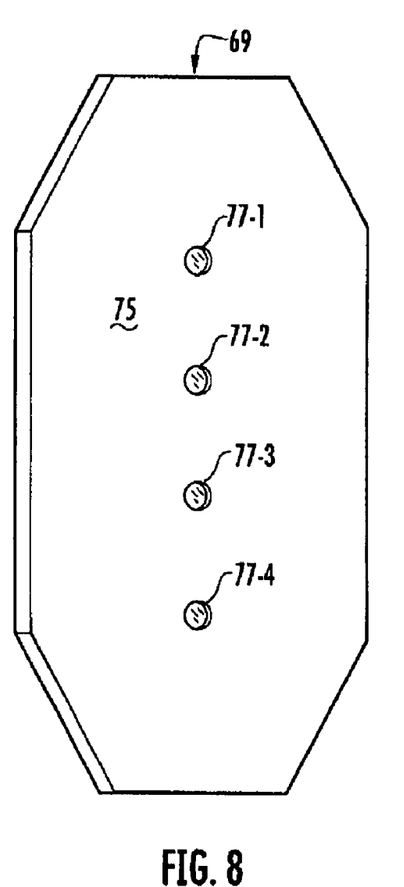
FIG. 8 is a rear perspective view of the end flange of FIG. 7.

FIG. 8 is a rear perspective view of the end flange 69 of FIG. 7. A rear surface 75 of the end flange 69 is generally flat and planar. The rear surface 75 includes a second connector structure. The second connector structure has features to complimentarily engage with features of the first connector structure. In one embodiment, the second connector structure includes a plurality of recessed portions, such as first, second, third and fourth recessed portions 77-1, 77-2, 77-3, 77-4.

The first projecting portion 59 is sized to engage within one of the first, second, third and fourth recessed portions 77-1, 77-2, 77-3, 77-4. Optionally, the spring-loaded pin 63 of the first projecting portion 59 is adapted to engage within an indent within a recessed portion 77, so as to create a removable attachment between the first projecting portion 59 and the recessed portion 77. The second projecting portion 61 would also be sized to engage within one of the first, second, third and fourth recessed portions 77-1, 77-2, 77-3, 77-4, in the same manner as the first projecting portion 59.

With the structure illustrated in FIGS. 5 and 8, the end flange 69 may be attached to the second end 57 of the spool body 53 in one of three different offset positions. When the first projecting portion 59 is engaged within the third recessed portion 77-3 and the second projecting portion 61 is engaged within the fourth recessed portion 77-4, the end flange 69 is in a first position relative to the second end 57 of the spool body 53, wherein the end flange 69 protrudes, or is offset, more in a first or upper direction from the spool body 53, as depicted in FIG. 10. When the first projecting portion 59 is engaged within the first recessed portion 77-1 and the second projecting portion 61 is engaged within the second recessed portion 77-2, the end flange 69 is in a second position relative to the second end 57 of the spool body 53, wherein the end flange 69 protrudes, or is offset, more in a second or lower direction from the spool body 53, as depicted in FIG. 12. When the first projecting portion 59 is engaged within the second recessed portion 77-2 and the second projecting portion 61 is engaged within the third recessed portion 77-3, the end flange 69 is in a third position relative to the second end 57 of the spool body 53, wherein the end flange 69 protrudes approximately equally in the upper and lower directions from the spool body 53, as depicted in FIG. 11.

Figure 9:
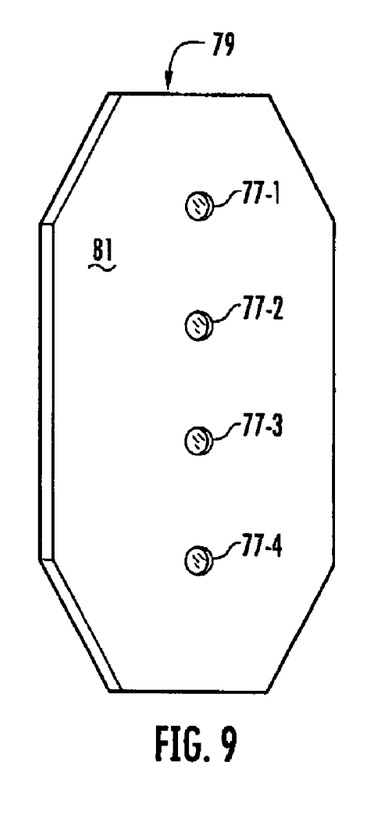
FIG. 9 is a rear perspective view of an optional, smaller end flange.

FIG. 9 illustrates a second end flange 79. The second end flange 79 is smaller than the end flange 69 of FIG. 8. A rear surface 81 of the second end flange 79 would include the same second connector structures as existing on the rear surface 75 of the end flange 69 in FIG. 8. In other words, first, second, third and fourth recessed portions 77-1, 77-2, 77-3, 77-4 would be provided with the same spacing therebetween, as compared to the end flange 69 of FIG. 8. Employing the smaller, second end flange 79 would conserve space in a network rack environment when less cabling is to be stored or guided by the spool.

The connector structures illustrated in FIGS. 5 and 8 demonstrate a releasable locking structure, such that the end flange 69 may be removed from the second end 57 of the spool body 53 and reattached to the second end 57 of the spool body 53 in a same or different position relative to the second end 57 of the spool body 53 at the discretion of the user. Also the end flange 69 may be removed from the spool body 53 and replaced with the smaller, second end flange 79.

FIGS. 5, 8 and 9 illustrate one embodiment of a connector structure. It should be appreciated that other connector structures could be employed. For example, the cylindrical shape of the first and second projecting portions 59 and 61 could be replaced with a cube-like shape. As such, it would be possible to eliminate the second projecting portion 61. If the recessed portions 77-1, 77-2, 77-3, 77-4 were made of a complimentary square shape, it would be possible to attach the end flange 69 to the second end 57 of the spool body 53 in one of four different relative positions. To that end, it is envisioned that more or fewer positions than three or four positions could be provided for the end flange 69 on the second end 57 of the spool body 53 by providing more or fewer recessed portions 77.

In a second embodiment depicted in FIGS. 13-16, a spool 51' is half-moon shaped, similar in shape to the spools 34 and 42 in FIGS. 3 and 4, respectively. The spool 51' includes a third end flange 83. The third end flange 83 may be positioned in an infinite number of positions relative to a second end 85 of a second spool body 87. A first end 89 of the spool body 87 includes the resilient snap-locking tabs 67-1, 67-2, 67-3, 67-4 which are engaged to a support 91, such as a network rack for holding optical or electrical devices. A cable 93 is illustrated as being ran over the top of the spool body 87.

A connector structure is disposed between the end flange 83 and the second end 85 of the spool body 87. In the second embodiment, the connector structure may include a first connector structure in the form of a guide tab 95 attached to the second end 85 of the spool body 87 by fasteners 97. The connector structure may also include a second connector structure in the form of a guide slot 99 formed within the third end flange 83. The guide tab 95 is sized to fit within the guide slot 99 in a snug manner, such that the guide tab 95 remains stationary within the guide slot 99 due to friction, but can be moved within the guide slot 99 by overcoming the friction with a manual force applied by a user. By this arrangement, the connector structure provides a siding engagement where the third end flange 83 may be positioned in an infinite number of positions relative to the second end 85 of the spool body 87. Although, the sliding connector has been illustrated in combination with a half-moon shaped spool body 87, it could also be used in combination with the cylindrical spool body 53 of FIGS. 5 and 6.

Figure 13:
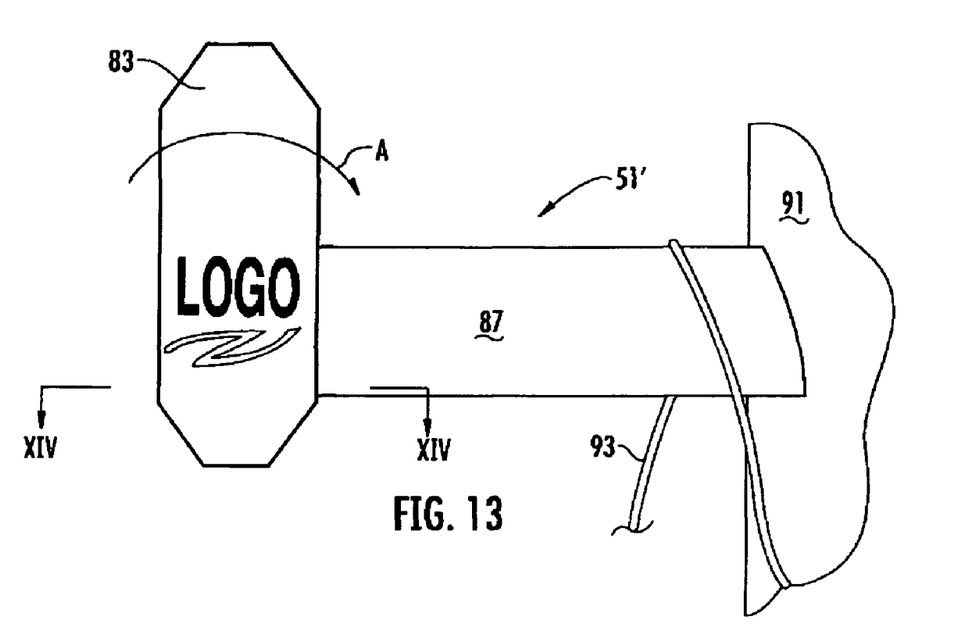
FIG. 13 front and side perspective view of an end flange and a spool body attached to a network rack and holding a cable, in accordance with a second embodiment of the present invention.
Figure 14:
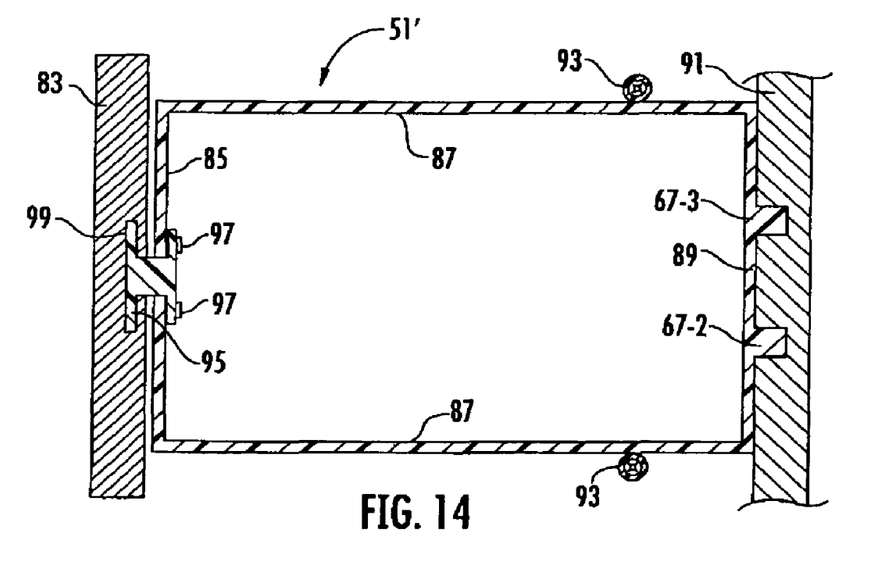
FIG. 14 is a cross sectional view taken along line XIV-XIV in FIG. 13.
Figure 15:
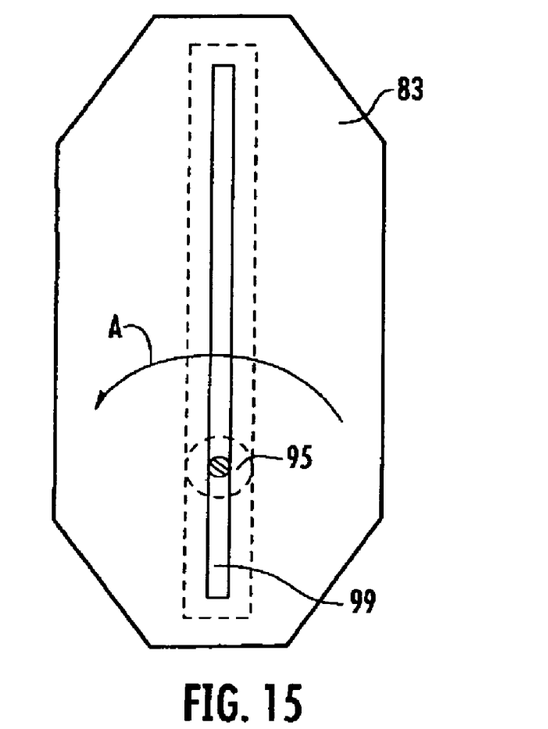
FIG. 15 is a cross sectional view of the rear surface of the end flange of FIG. 13.
Figure 16:
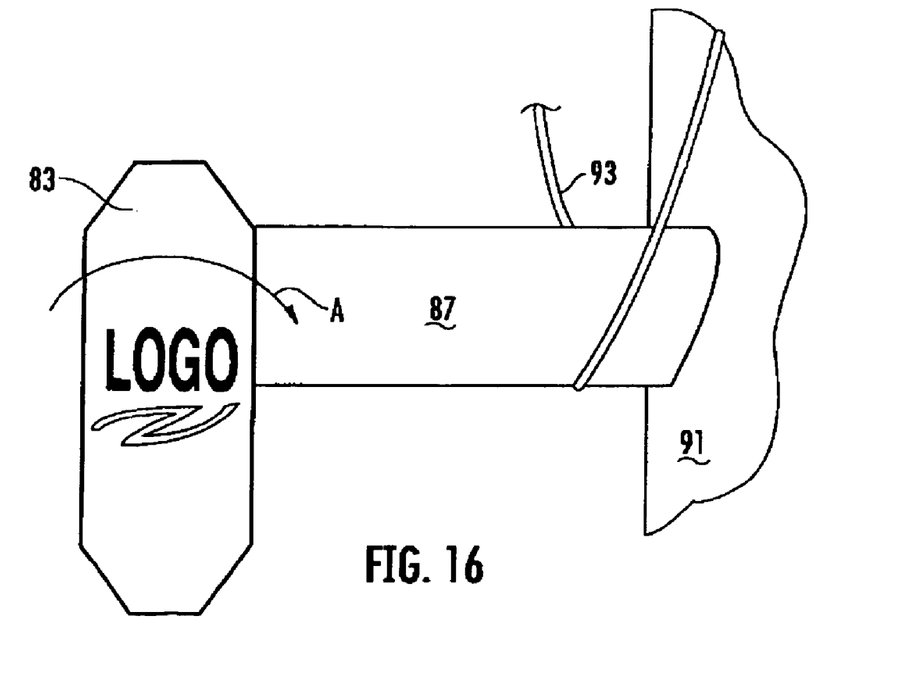
FIG. 16 is a front and side perspective view of the spool of FIG. 13, with the spool body inverted and the end flange rotated and slid downwardly.

Another feature of the embodiment of FIGS. 13 and 14 is that the guide tab 95 may possess a circular shape inside of the guide track 99, as illustrated in FIG. 15. By this arrangement, the third end flange 83 may be rotated about the guide tab 95 in the direction of arrow A in FIGS. 13 and 15. By this arrangement, the spool base 87 can be mounted upside down to accommodate cables passing along a bottom surface of the spool body 87, in a manner similar to the spool 46 in FIG. 4. Yet as illustrated in FIG. 16, the "LOGO" printed on the end flange 83 will be properly oriented and the end flange 83 may be slid to be offset in a downward direction.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A spool apparatus comprising:
   a spool body having a first end and a second end opposite to said first end;
   locking features on said first end of said spool body, said locking features engaging a support for said spool body;
   a first connector structure attached to said second end of said spool body;
   an end flange; and
   a second connector structure attached to said end flange, wherein said second connector structure has features to complimentarily engage with features of said first connector structure, and wherein said first and second connector structures allow said end flange to be attached to said spool body in a first position relative to said spool body and in a second position relative to said spool body, different from said first position.

2. The apparatus of claim 1, wherein said second connector structure includes a recessed portion, and wherein said first connector structure includes a projecting portion, sized to engage within said recessed portion.

3. The apparatus of claim 1, wherein said second connector structure includes at least three recessed portions, and wherein said first connector structure includes a projecting portion, sized to engage within one of said plurality of recessed portions, such that said end flange has at least three different positions relative to said spool body.

4. The apparatus of claim 1, wherein one of said first and second connector structures includes a guide slot, and wherein the other of said first and second connector structures includes a guide tab sized to fit within said guide slot.

5. The apparatus of claim 4, wherein said guide tab remains stationary within said guide slot due to friction, but can be moved within said guide slot by overcoming the friction with a manual force.

6. The apparatus of claim 4, wherein said second connector structure includes said guide slot and said first connector structure includes said guide tab.

7. The apparatus of claim 1, wherein said first and second connector structures cooperate to permit rotation of said end flange relative to said spool body between said first position and said second position.

8. The apparatus of claim 1, wherein said locking features include resilient snap-locking tabs.

9. A cabling spool apparatus for guiding or storing cable comprising:
   a spool body having a first end for attachment to a support for holding optical or electrical devices and having a second end opposite to said first end;
   an end flange attached to said second end of said spool body; and
   a connector structure disposed between said end flange and said second end of said spool body, wherein said connector structure allows said end flange to be positioned in at least two different positions relative to said second end of said spool body, further comprising:
   the support; and
   locking features on said first end of said spool body, said locking features engaging said support, wherein said connector structure includes:
   a first connector structure attached to said second end of said spool body; and
   a second connector structure attached to said end flange, wherein said second connector structure has features to complimentarily engage with features of said first connector structure.

10. The apparatus of claim 9, wherein said end flange may be positioned in at least three positions relative to said second end of said spool body including a first position wherein said end flange protrudes more in a first direction from said spool body than said end flange protrudes in a second direction from said spool body, a second position wherein said end flange protrudes more in the second direction from said spool body than said end flange protrudes in the first direction from said spool body, and a third position wherein said end flange protrudes approximately equally in the first and second directions from said spool body.

11. The apparatus of claim 9, wherein said connector structure includes a sliding engagement such that said end flange may be positioned in an infinite number of positions relative to said second end of said spool body.

12. The apparatus of claim 9, wherein said connector structure includes a releasable locking structure such that said end flange may be removed from said second end of said spool body and reattached to said second end of said spool body in a same or different position relative to said second end of said spool body at the discretion of the user.

13. The apparatus of claim 9, wherein said connector structure allows said end flange to rotate relative to said second end of said spool body between said first position and said second position.

14. A network rack comprising:
   a support for holding optical or electrical devices;
   a spool body having a first end attached to said support and a second end remote from said first end;
   an end flange attached to said second end of said spool body; and
   a connector structure disposed between said end flange and said second end of said spool body, wherein said connector structure allows said end flange to be positioned in at least three positions relative to said second end of said spool body including a first position wherein said end flange protrudes more in a first direction from said spool body than said end flange protrudes in a second direction from said spool body, a second position wherein said end flange protrudes more in the second direction from said spool body than said end flange protrudes in the first direction from said spool body, and a third position wherein said end flange protrudes approximately equally in the first and second directions from said spool body.

15. The network rack of claim 14, wherein said connector structure includes a first connector structure attached to said second end of said spool body, and a second connector structure attached to said end flange, wherein said second connector structure has features to complimentarily engage with features of said first connector structure and wherein said second connector structure includes a plurality of recessed portions, and wherein said first connector structure includes a projecting portion, sized to engage within one of said plurality of recessed portions.

16. The network rack of claim 14, wherein said connector structure includes a first connector structure attached to said second end of said spool body, and a second connector structure attached to said end flange, wherein said second connector structure has features to complimentarily engage with features of said first connector structure and wherein one of said first and second connector structures includes a guide slot, and wherein the other of said first and second connector structures includes a guide tab sized to fit within said guide slot.

17. The network rack of claim 14, wherein said connector structure includes a sliding engagement such that said end flange may be positioned in an infinite number of positions relative to said second end of said spool body.

18. The network rack of claim 14, wherein said connector structure includes a rotatable connection such that said end flange may be rotated relative to said second end of said spool body.

* * * * *